(12) United States Patent
Bourgeois et al.

(10) Patent No.: US 7,803,493 B2
(45) Date of Patent: Sep. 28, 2010

(54) FUEL CELL SYSTEM WITH SEPARATING STRUCTURE BONDED TO ELECTROLYTE

(75) Inventors: Richard Scott Bourgeois, Albany, NY (US); Sauri Gudlavalleti, Albany, NY (US); Shu Ching Quek, Clifton Park, NY (US); Wayne Charles Hasz, Pownal, VT (US); James Daniel Powers, Santa Monica, CA (US)

(73) Assignee: General Electric Company, Niskayuna, NY (US)

( * ) Notice: Subject to any disclaimer, the term of this patent is extended or adjusted under 35 U.S.C. 154(b) by 755 days.

(21) Appl. No.: 10/953,756

(22) Filed: Sep. 29, 2004

(65) Prior Publication Data

US 2006/0068261 A1 Mar. 30, 2006

(51) Int. Cl.
*H01M 8/04* (2006.01)

(52) U.S. Cl. ............... 429/460; 429/456; 429/457; 429/512; 429/513; 429/514

(58) Field of Classification Search ............... None
See application file for complete search history.

(56) References Cited

U.S. PATENT DOCUMENTS

| | | | |
|---|---|---|---|
| 4,942,099 A * | 7/1990 | Isobe et al. ............... 429/35 |
| 5,321,581 A | 6/1994 | Bartilson et al. |
| 6,000,464 A | 12/1999 | Scafidi et al. |
| 6,492,053 B1 * | 12/2002 | Donelson et al. ............ 429/34 |
| 6,525,936 B2 | 2/2003 | Beitelmal et al. |
| 6,656,625 B1 * | 12/2003 | Thompson et al. ............ 429/36 |
| 6,744,632 B2 | 6/2004 | Wilson et al. |
| 2003/0121645 A1 | 7/2003 | Wang |
| 2003/0175573 A1 * | 9/2003 | Yoo et al. ............ 429/34 |
| 2003/0232230 A1 * | 12/2003 | Carter et al. ............ 429/32 |
| 2004/0200187 A1 * | 10/2004 | Warrier et al. ............ 52/782.1 |

FOREIGN PATENT DOCUMENTS

JP 06-068883 * 3/1994

* cited by examiner

*Primary Examiner*—Jonathan Crepeau
*Assistant Examiner*—Tony Chuo
(74) *Attorney, Agent, or Firm*—Francis T. Coppa (57) ABSTRACT

A fuel cell assembly comprises a separating structure configured for separating a first reactant and a second reactant wherein the separating structure has an opening therein. The fuel cell assembly further comprises a fuel cell comprising a first electrode, a second electrode, and an electrolyte interposed between the first and second electrodes, and a passage configured to introduce the second reactant to the second electrode. The electrolyte is bonded to the separating structure with the first electrode being situated within the opening, and the second electrode being situated within the passage.

17 Claims, 8 Drawing Sheets

FUEL CELL SYSTEM WITH SEPARATING STRUCTURE BONDED TO ELECTROLYTE

STATEMENT REGARDING FEDERALLY SPONSORED RESEARCH OR DEVELOPMENT

The U.S. Government may have certain rights in this invention pursuant to contract number DE-FC26-01NT41245 awarded by the U.S. Department of Energy.

BACKGROUND OF THE INVENTION

This invention relates generally to fuel cell systems and more specifically to fuel cell systems with an efficient sealing arrangement. A fuel cell produces electricity by catalyzing fuel and oxidant into ionized atomic hydrogen and oxygen at, respectively, the anode and cathode. The electrons removed from hydrogen in the ionization process at the anode are conducted to the cathode where they ionize the oxygen. In the case of a solid oxide fuel cell, the oxygen ions are conducted through the electrolyte where they combine with ionized hydrogen to form water as a waste product and complete the process. The electrolyte is otherwise impermeable to both fuel and oxidant and merely conducts oxygen ions. This series of electrochemical reactions is the sole means of generating electric power within the fuel cell. It is therefore desirable to reduce or eliminate any mixing of the reactants that results in a different combination such as combustion, which combustion does not produce electric power and therefore reduces the efficiency of the fuel cell.

The fuel cells are typically assembled in electrical series in a fuel cell assembly to produce power at useful voltages. To create a fuel cell assembly, an interconnecting member is used to connect the adjacent fuel cells together in electrical series. When the fuel cells are operated at high temperatures, such as between approximately 600° Celsius (C) and 1000° C., the fuel cells are subjected to mechanical and thermal loads that may create strain in the fuel cell assembly and affect the seal separating the oxidant and the fuel paths.

Therefore there is a need to design a fuel cell assembly, which assembly is sealed in an efficient way to keep the oxidant and the fuel path separated at high operating temperatures.

BRIEF DESCRIPTION OF THE INVENTION

In one aspect, a fuel cell assembly comprises a separating structure configured for separating a first reactant and a second reactant wherein the separating structure has an opening therein. The fuel cell assembly further comprises a fuel cell comprising a first electrode, a second electrode, and an electrolyte interposed between the first and second electrodes, and a passage configured to introduce the second reactant to the second electrode. The electrolyte is bonded to the separating structure with the first electrode being situated within the opening, and the second electrode being situated within the passage.

In yet another aspect, a fuel cell assembly comprises a separating structure configured for separating a first reactant and a second reactant, wherein the separating structure has an opening therein. The fuel cell assembly further comprises a fuel cell comprising a first electrode, a second electrode, and an electrolyte interposed between the first and second electrodes. The electrolyte is bonded to the separating structure with the first electrode being situated within the opening of the separating structure. The fuel cell assembly also includes a passage configured to introduce the second reactant to the second electrode. The separating structure comprises a top lid including the opening of the separating structure and a bottom lid facing the second electrode and the second electrode is situated within the passage configured to introduce the second reactant to the second electrode.

In another aspect, a fuel cell assembly comprises a separating structure configured for separating a first reactant and a second reactant, wherein the separating structure has an opening therein. The fuel cell assembly further comprises a fuel cell comprising a first electrode, a second electrode, and an electrolyte interposed between the first and second electrodes. The electrolyte is bonded to the separating structure with the first electrode being situated within the opening of the separating structure. The fuel cell assembly also includes a passage configured to introduce the second reactant to the second electrode. The separating structure comprises a top lid including the opening of the separating structure and a bottom lid bonded to the top lid encompassing the second electrode and the second electrode is situated within the passage configured to introduce the second reactant to said second electrode.

In yet another aspect, a fuel cell stack comprises at least two fuel cell repeat units electrically coupled together such that at least one sealed passage extends between the two fuel cell repeat units. Each of the two fuel cell repeat units comprises a fuel cell comprising an anode and a cathode, and an electrolyte interposed between the anode and cathode. Each fuel cell repeat unit further comprises an oxidant passage lid defining an oxidant passage configured to deliver an oxidant to the cathode. The oxidant passage has an opening therein. The repeat unit also includes a fuel passage lid defining a fuel passage to deliver a fuel to the anode. The electrolyte is bonded to the oxidant passage lid with the cathode being situated within the opening of the oxidant passage, and the anode is situated within the fuel passage.

In yet another aspect, a fuel cell stack comprises at least two fuel cell assemblies electrically coupled together such that at least one sealed passage extends between the fuel cell assemblies. Each of the fuel cell assemblies comprises a separating structure configured for separating a fuel and an oxidant. The separating structure has an opening therein. Each fuel cell assembly further comprises a fuel cell comprising a cathode and an anode, and an electrolyte interposed between the anode and cathode. The electrolyte is bonded to the separating structure with the cathode being situated within the opening of the separating structure. Each fuel cell assembly also includes a passage configured to introduce the fuel to the anode, and an insulating spacer to join the fuel cell assemblies. The separating structure comprises a top lid and a bottom lid, wherein the bottom lid is bonded to the top lid, encompassing the anode and the second electrode is situated within the passage.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Fuel cells, such as solid oxide fuel cells, have demonstrated a potential for high efficiency and low pollution in power generation. A fuel cell is an energy conversion device that produces electricity by electrochemically combining a fuel and an oxidant across an ionic conducting layer. Fuel cells may have planar or tubular configurations. Fuel cells may be stacked together either in series or in parallel to construct fuel cell architecture capable of producing a resultant electrical energy output. Disclosed herein are fuel cell systems comprising a separating structure configured for separating a first reactant and a second reactant. The separating structure is also configured to have an opening therein. The fuel cell system further comprises a fuel cell comprising a first electrode, a second electrode, and an electrolyte interposed between the first and second electrodes and a passage configured to introduce the second reactant to the second electrode. The electrolyte is bonded to the separating structure with the first electrode being situated within the opening of the separating structure, and the second electrode being situated within the passage configured to introduce the second reactant to the second electrode.

Figure 1:
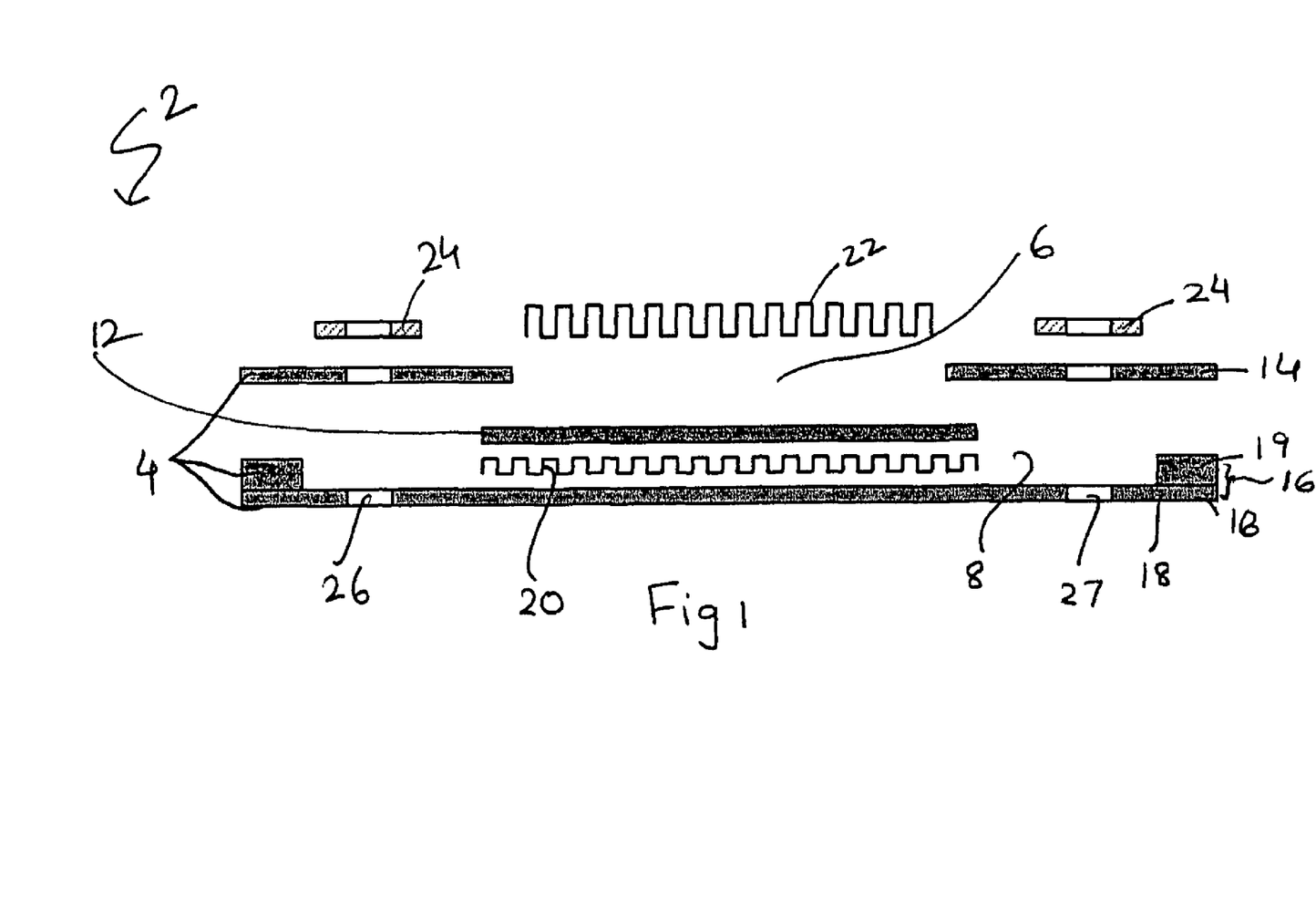
FIG. 1 illustrates a cross sectional exploded view of an exemplary fuel cell assembly.
Figure 2:
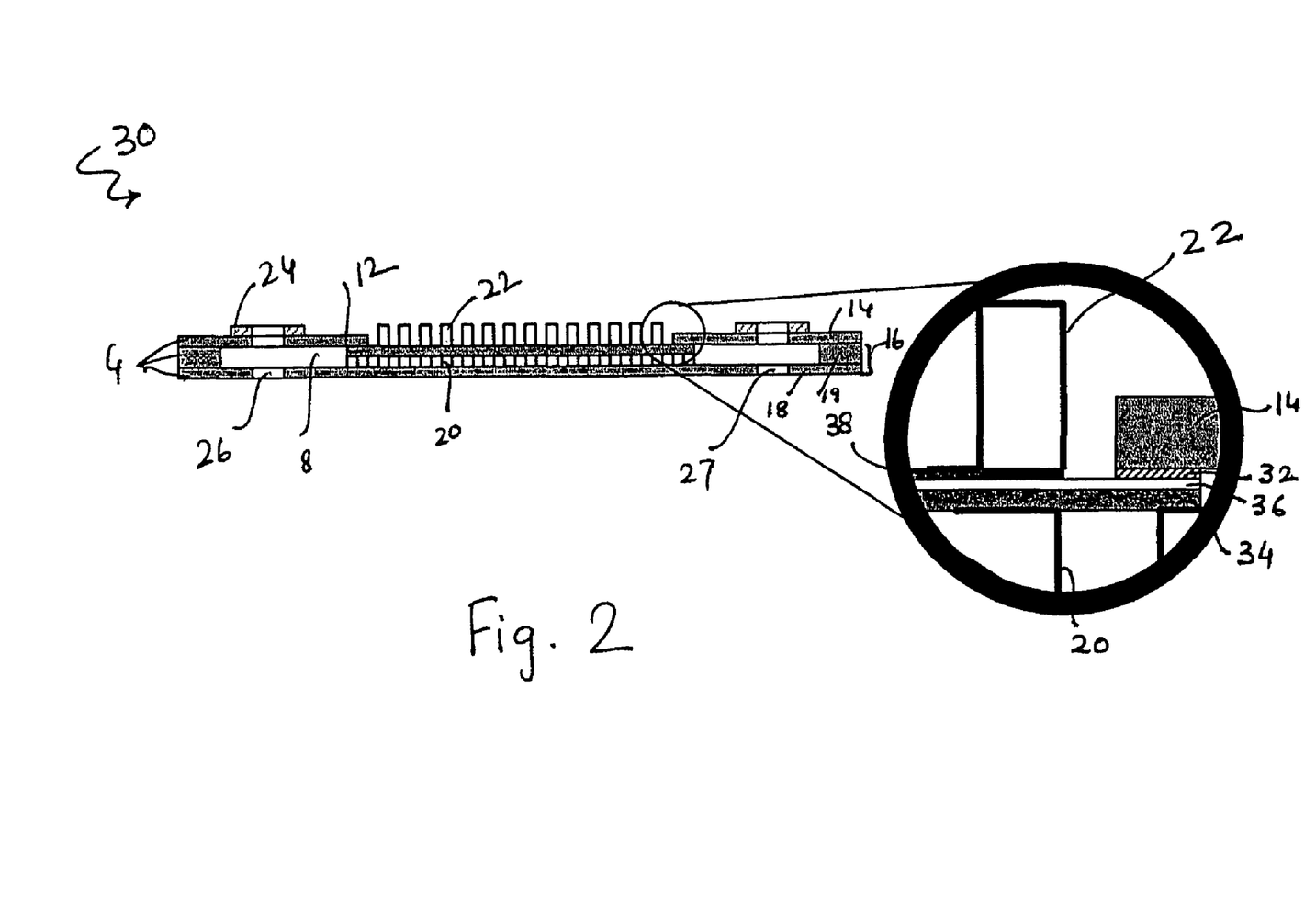
FIG. 2 illustrates a cross sectional view of the exemplary fuel cell assembly with an exploded view of the sealing arrangement.

FIG. 1 illustrates a cross sectional exploded view of an exemplary fuel cell assembly and FIG. 2 illustrates a cross sectional view of the exemplary fuel cell assembly of FIG. 1 with an exploded view of the sealing arrangement. In the exemplary embodiment as illustrated in FIG. 1, fuel cell assembly 2 comprises a separating structure 4 configured for separating a first reactant and a second reactant. The separating structure 4 is configured to have an opening 6 therein. In this exemplary embodiment, the first reactant is an oxidant and the second reactant is a fuel. As illustrated in FIG. 2, the fuel cell system 30 further comprises a fuel cell 12 comprising a first electrode 38, a second electrode 34, an electrolyte 36 interposed between the first and second electrodes and a passage 8 configured to introduce the second reactant to the second electrode 34. In this exemplary embodiment, the first electrode 38 is a cathode and the second electrode 34 is an anode. The electrolyte 36 is bonded to the separating structure 4 with the first electrode 38 being situated within the opening 6 of the separating structure 4 and the second electrode 34 being situated within the passage 8. For ease of illustration, in the specific embodiments described herein, the first electrode is a cathode and the second electrode is an anode. Accordingly the first reactant is an oxidant and the second reactant is a fuel. In some other embodiments, the first electrode is an anode and the second electrode is a cathode. It may be noted that all the description of the individual elements in the following sections will be applicable for both the embodiments described above.

The separating structure 4 as shown in FIGS. 1-2 may be comprised of a single structure or it may comprise of more than one element. As illustrated in FIGS. 1-2, separating structure 4 comprises a top lid 14 and a bottom lid 16. The top lid 14 includes the opening 6 and the bottom lid 16 is bonded to the top lid 14. The anode 34 is situated within the bottom lid 16. In some embodiments as illustrated in FIGS. 1-2, the bottom lid comprises a fuel passage plate 19 and a bottom plate 18. The fuel cell assembly 30 further comprises a plurality of channels 20 configured to flow the fuel, which channels are in contact with the bottom plate 18 and the anode 34. The fuel is introduced to the fuel passage 8 by a fuel inlet passage 26 and the fuel exits from the fuel passage 8 through a fuel exit passage 27. The fuel inlet passage 26 and fuel exit passage 27 are typically defined by a hollow electrical insulator (not shown) that may be fabricated from, but is not limited to, a ceramic material. The separating structure 4 acts as an interconnect to electrically connect one fuel cell assembly to the next fuel cell assembly. The fuel cell assembly 30 also comprises a plurality of channels 22 configured to flow the oxidant, which channels are in contact with the cathode 38. The fuel cell assembly further comprises an insulating spacer 24, which spacer can electrically isolate one fuel assembly from the adjacent fuel cell assembly in a stack.

In the exemplary fuel cell 12, such as the solid oxide fuel cell (SOFC), oxygen ions ($O^{2-}$) generated at the cathode are transported across the electrolyte interposed between the anode and the cathode. The fuel, for example hydrogen, is fed to the anode. The fuel at the anode reacts with oxygen ions ($O_2^-$) transported to the anode across the electrolyte. The oxygen ions ($O^{2-}$) release their electrons to an external electric circuit (not shown), as they join with hydrogen ions ($H^+$) to form water. The electron flow thus produces direct current electricity across the external electric circuit.

In the exemplary embodiment as shown in FIG. 1, the cell 12 comprises a single fuel cell having a planar configuration, although multiple such cells may be provided in a single structure, which structure may be referred to as a stack or a collection of cells or an assembly. The cell 12 comprises a cathode, an anode and an electrolyte disposed between the anode and the cathode. An oxidant flows in the cathode side of the cell 12 and a fuel flows in the anode side of the cell 12.

The main purpose of the anode 34 is to provide reaction sites for the electrochemical oxidation of a fuel introduced into the fuel cell. In addition, the anode material should be stable in the fuel-reducing environment, have adequate electronic conductivity, surface area and catalytic activity for the fuel gas reaction at the fuel cell operating conditions and have sufficient porosity to allow gas transport to the reaction sites. The anode can be made of a number of materials having these properties, including but not limited to, metal, Ni, Ni Alloy, Ag, Cu, Noble metals, Cobalt, Ruthenium, Ni-YSZ cermet, Cu-YSZ cermet, Ni-Ceria, cermet, ceramics or combinations thereof.

Electrolyte 36 is disposed upon anode 34 typically via deposition. The main purpose of the electrolyte is to conduct ions between the anode and a cathode. The electrolyte carries ions produced at one electrode to the other electrode to balance the charge from the electron flow and complete the electrical circuit in the fuel cell. Additionally, the electrolyte separates the fuel from the oxidant in the fuel cell. Accordingly, the electrolyte must be stable in both the reducing and oxidizing environments, impermeable to the reacting gases and adequately conductive at the operating conditions. Typically, the electrolyte is substantially electronically insulating. The electrolyte can be made of a number of materials having these properties, including but not limited to, $ZrO_2$, YSZ, doped ceria, $CeO_2$, Bismuth sesquioxide, pyrochlore oxides, doped zirconates, perovskite oxide materials and combinations thereof.

Electrolyte 36 has a thickness such that the electrolyte is substantially gas impermeable. The thickness of electrolyte is typically less than 50 microns, more specifically in the range between about 0.1 microns thick to about 10 microns, and even more specifically in the range between about 1 microns thick to about 5 microns thick.

Cathode 38 is disposed upon electrolyte 36. The main purpose of cathode is to provide reaction sites for the electrochemical reduction of the oxidant. Accordingly, the cathode must be stable in the oxidizing environment, have sufficient electronic conductivity, surface area and catalytic activity for the oxidant gas reaction at the fuel cell operating conditions and have sufficient porosity to allow gas transport to the reaction sites. The cathode can be made of a number of materials having these properties, including but not limited to, an electrically conductive oxide, perovskite, doped $LaMnO_3$, Sr-doped $LaMnO_4$ (LSM), tin doped Indium Oxide ($In_2O_3$), Strontium-doped $PrMnO_3$, $LaFeO_3$—$LaCoO_3$ $RuO_2$-YSZ, La Cobaltite, and combinations thereof.

Figure 3:
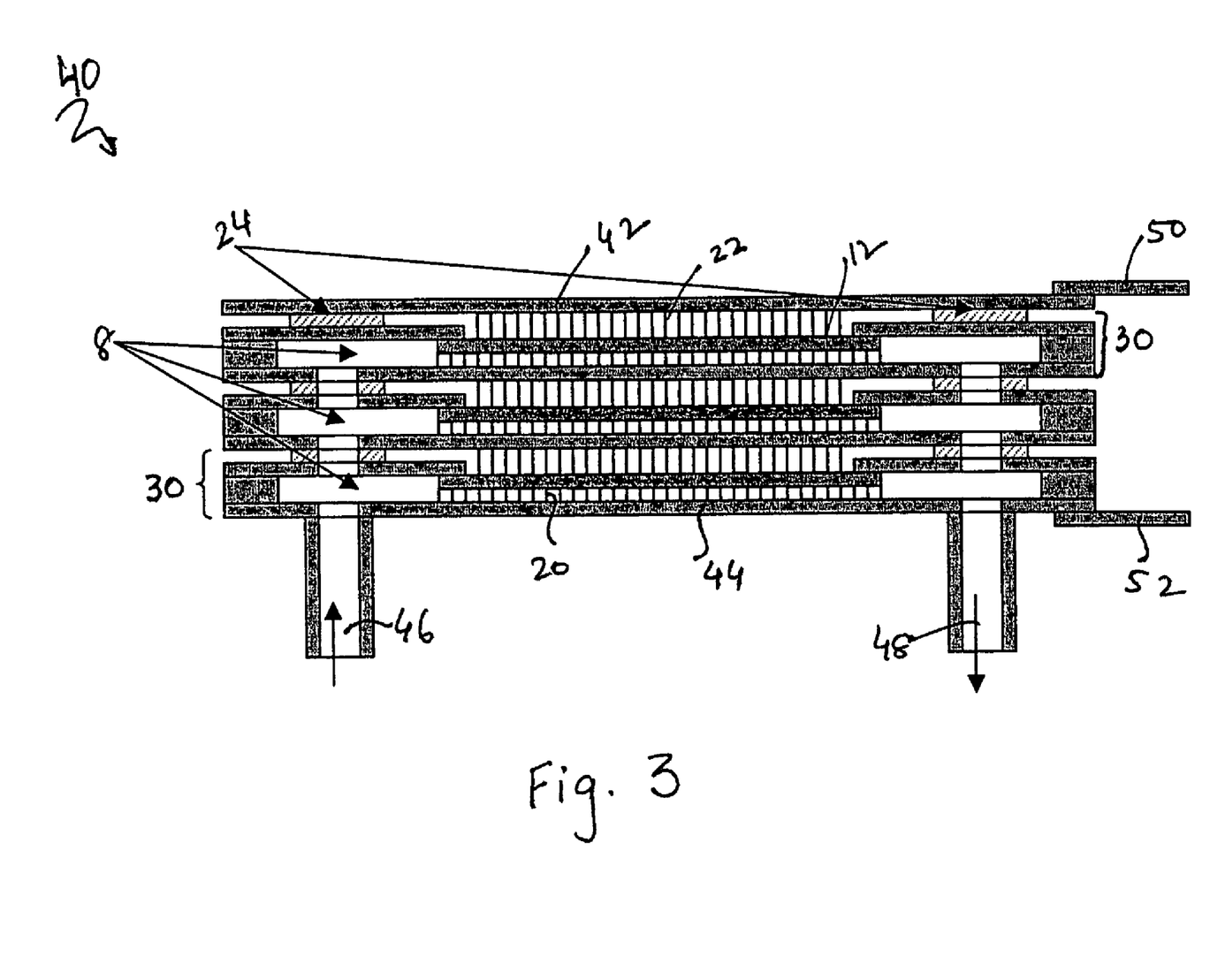
FIG. 3 illustrates a cross sectional view of an exemplary fuel cell stack.

FIG. 3 illustrates a cross-sectional view of an exemplary fuel cell stack 40 that comprises a plurality of fuel cell assemblies 30. Each fuel cell assembly 30 is similar to that discussed with respect to FIG. 2 in that it comprises the fuel cell 12, the separating structure 4 and the fuel passage 8 comprising a plurality of flow channels 20, which flow channels acts as the anode interconnect. The fuel cell assembly 30 further comprises flow channels 22 for the oxidant, such as air and an insulating spacer to isolate one fuel cell assembly from the adjacent fuel cell assembly. In an exemplary embodiment, flow channels 20 and 22 are fabricated from an electrically conductive material, such as, but not limited to, conductive materials capable of operating at higher temperatures. As described above with respect to FIG. 2, the fuel cell 12 in each fuel cell assembly 30 comprises an anode 34, a cathode 38 and an electrolyte 36 disposed there between, and fuel cell 12 is disposed in such a way that the cathode 38 is situated in the opening 6 of the separating structure 4 and anode 34 is situated in the fuel passage 8. The electrolyte 36 is bonded to the separating structure using a glass or mica seal. The fuel cell stack 40 includes an inlet passage 46 for fuel introduction and an exit passage 48 for fuel exit. The fuel inlet passage 46 and fuel exit passage 48 are typically defined by a hollow electrical insulator (not shown) that may be fabricated from, but is not limited to, a ceramic material. The fuel cell stack 40 further comprises two end plates 42 and 44 and a positive terminal 50 and a negative terminal 52 to collect the electrical energy generated by the fuel cell stack 40. The flow channels 22 and 20 may be arranged such that the reactant flows are parallel in opposite directions, parallel in the same direction, or perpendicular to each other. Fuel and oxidant react in the fuel cells, which are connected in series in the stack to build the voltage to useful levels. Current is collected in the stack end plates 42 and 44.

Figure 4:
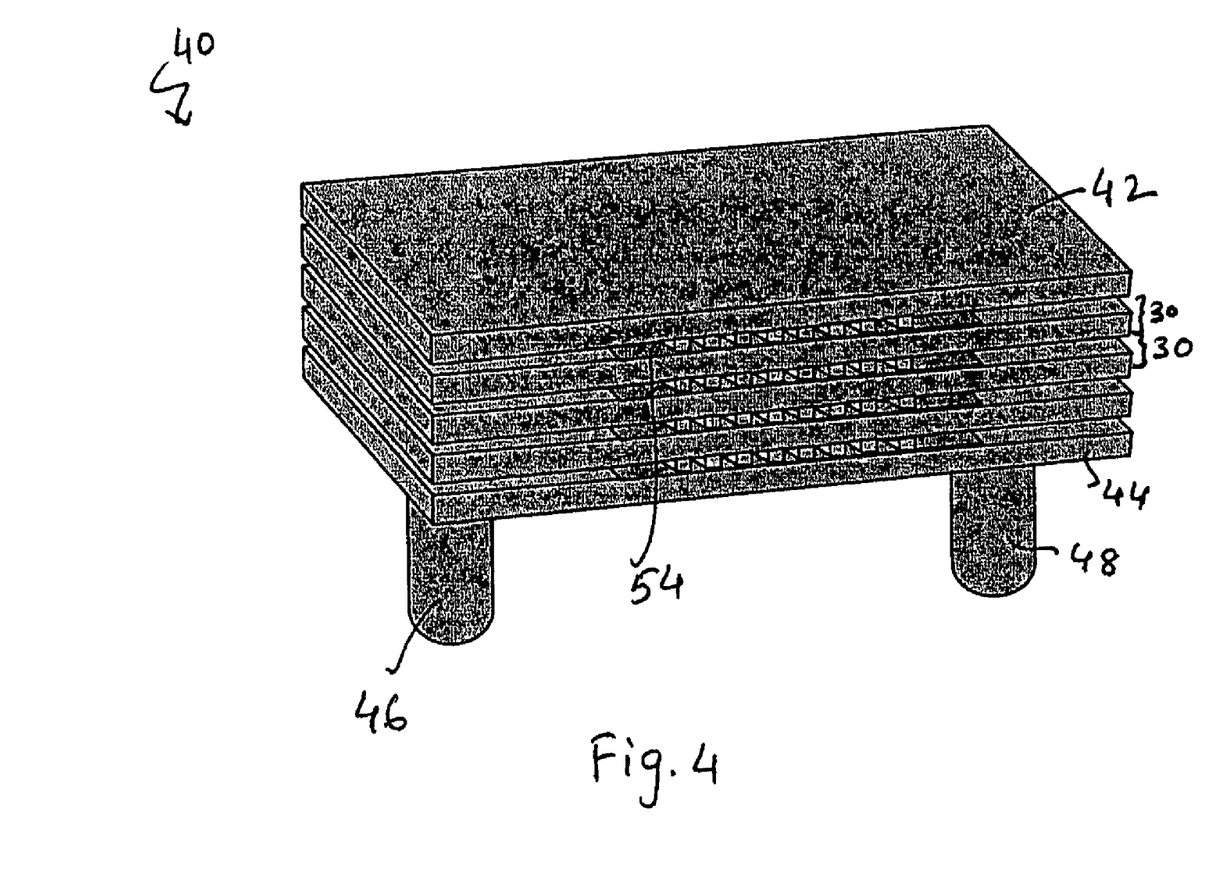
FIG. 4 illustrates a perspective view of the exemplary fuel cell stack of FIG. 3.

FIG. 4 illustrates a perspective view of the exemplary fuel cell stack 40 of FIG. 3. The fuel cell stack is in an environment wherein the oxidant such as air can be introduced to the fuel cell stack through the openings 62. In operation, as described in more detail below, when a fuel enters through the fuel inlet passage 46, fuel flow is channeled through the fuel channels 20 and contacts anode 34 (situated with the fuel passage 8, shown in FIG. 2). Fuel flow is then discharged from the stack 40 through the fuel exit passage 48.

A fuel, such as, hydrogen, and/or a hydrocarbon which is reformed either within the fuel cell stack 40 or is pre-reformed, is supplied to fuel cell stack 40 through the fuel inlet passage 46. A pre-reformed fuel is defined as a mixture comprising hydrogen, carbon dioxide and carbon monoxide. Fuel and oxidant react in each fuel cell assembly 30 to build voltage to useful levels. More specifically, the fuel reacts electrochemically with oxygen, supplied to the stack 40, to generate direct current (DC) electricity with water as the main product. An oxidant, surrounding the stack 40, flows over the cathode 38 and is channeled through the oxidant channels 22, which channels 22 function as a cathode interconnect.

In conventional fuel cell systems, the anode of the fuel cell is bonded to the separating structure. In accordance with embodiments of the present technique as illustrated in FIGS. 1-4, the anode is not bonded to the metal structure. In conventional processes, due to the porous nature of anode, the sealing material gets absorbed by the anode material, which weakens the sealing due to depletion of the sealing material. In the disclosed embodiments, the sealing 32 is done between the dense electrolyte and the separating structure. Therefore the sealing material does not become depleted by being absorbed in the electrolyte. In conventional fuel cells, the perimeter of the anode may get exposed to the oxidant and lose the desired reduced state. This oxidation of anode is avoided in the embodiments of FIGS. 1-4 by disposing the fuel cell in a manner that the anode is fully exposed to the fuel passage and is shielded from the oxygen passage as the electrolyte is bonded to the separating structure.

Figure 5:
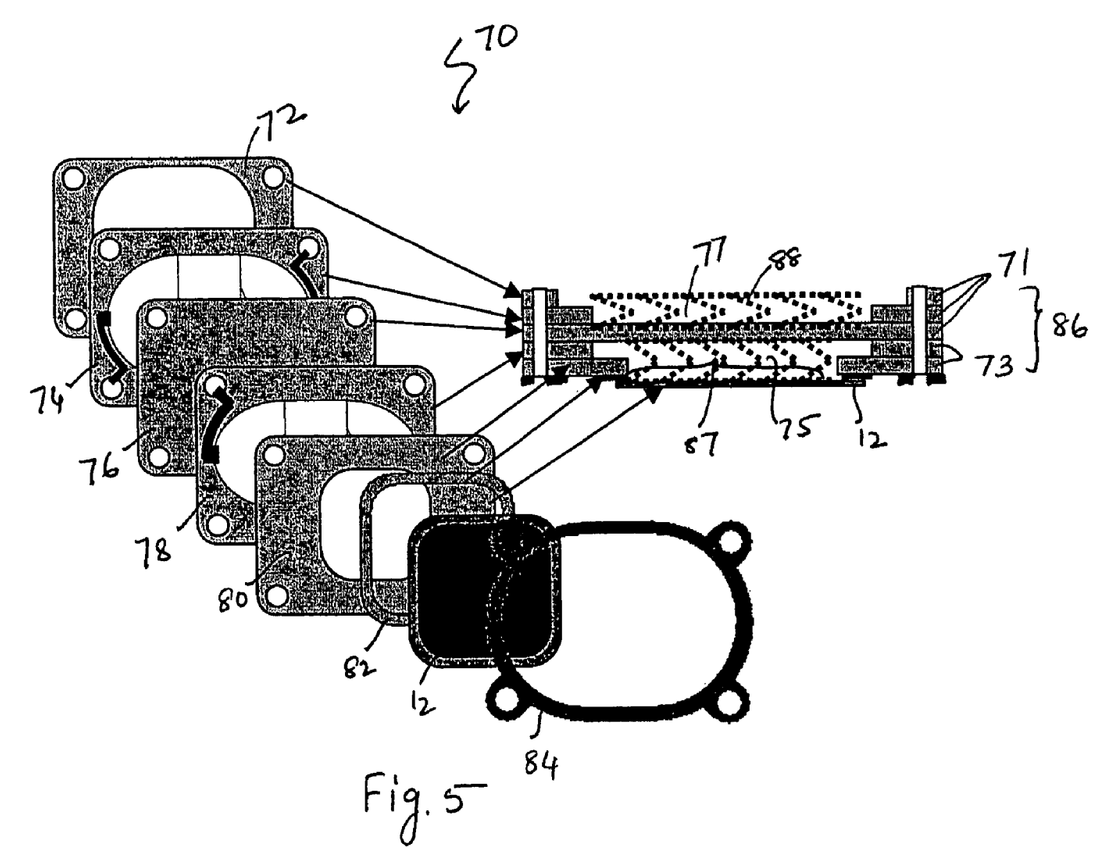
FIG. 5 illustrates a cross sectional view of an exemplary fuel cell repeat unit with exploded perspective views of each element.

FIG. 5 illustrates an exemplary fuel cell repeat unit 70 with exploded views of the individual elements. A repeat unit in a fuel cell stack is built in such a way that the repeat units can be assembled to form a stack. As illustrated in FIG. 5, each exemplary repeat unit 90 comprises an fuel passage lid 71, which further comprises a plurality of plates including a fuel box cover 72 a fuel passage plate 74 and a bipolar plate 76. The repeat unit 70 also comprises an oxidant passage lid 73, which further comprises a plurality of plates including an oxidant passage plate 78 and an oxidant box cover 80. The oxidant passage lid 73 and the bipolar plate 76 define the oxidant passage 75 and the fuel passage lid 71 defines the fuel passage 77 of the next repeat unit. These plates are metallurgically joined by processes such as brazing or welding, for example, to form the structure 86. The compliant structures 88 are attached to the bipolar plate 76. The repeat unit 70 further comprises a fuel cell 12 sealed to the oxidant box cover 80 using a seal 82. A compressive gasket 84 is used to join one repeat unit to the next repeat unit in a fuel cell stack.

Figure 6:
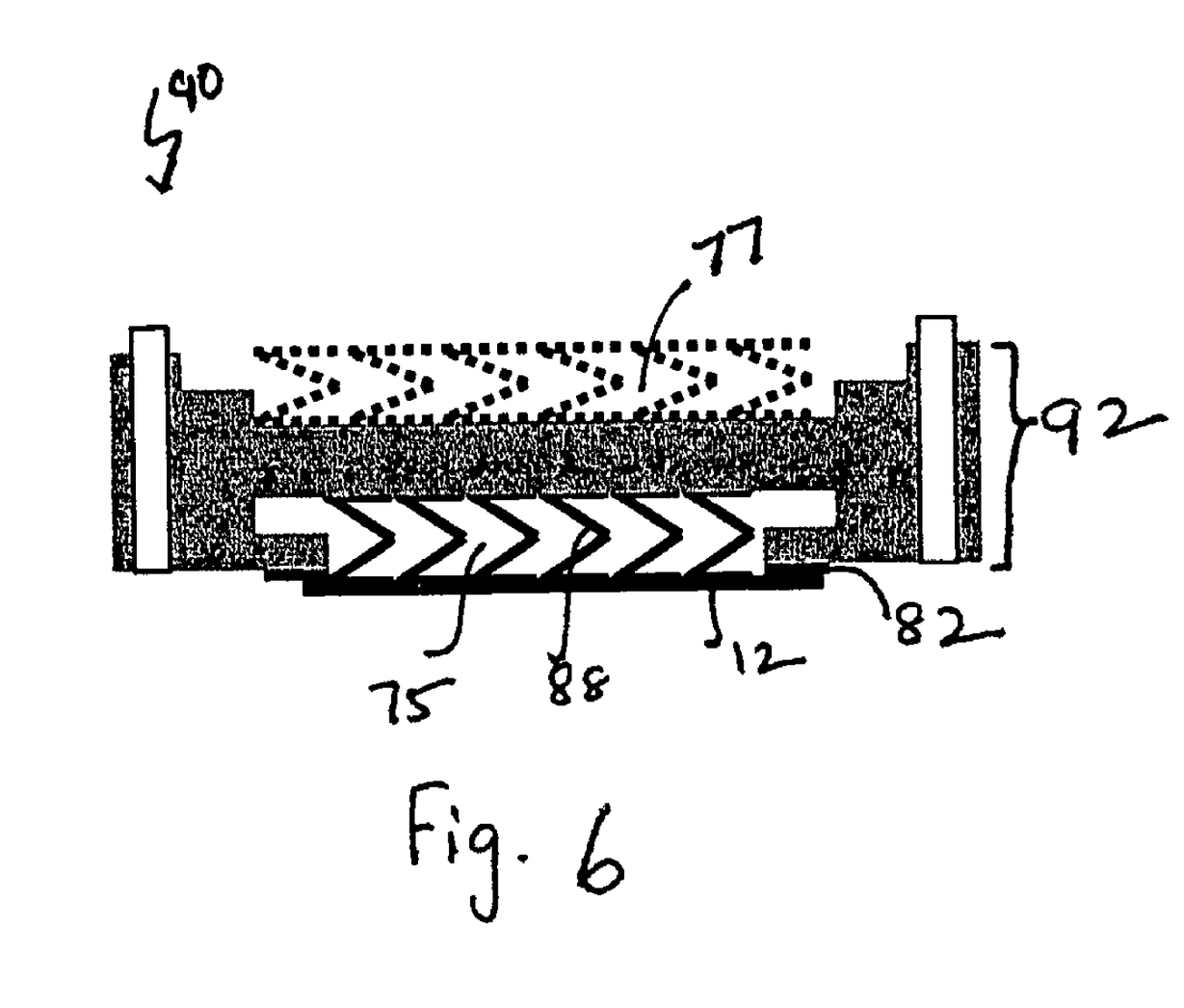
FIG. 6 illustrates a cross sectional view of yet another fuel cell repeat unit.

FIG. 6 illustrates yet another exemplary repeat unit 90. The exemplary repeat unit 90 comprises an integral structure 92 (rather than a bonded layer structure) a fuel cell 12, a seal 82 and the compliant structures 88.

Figure 7:
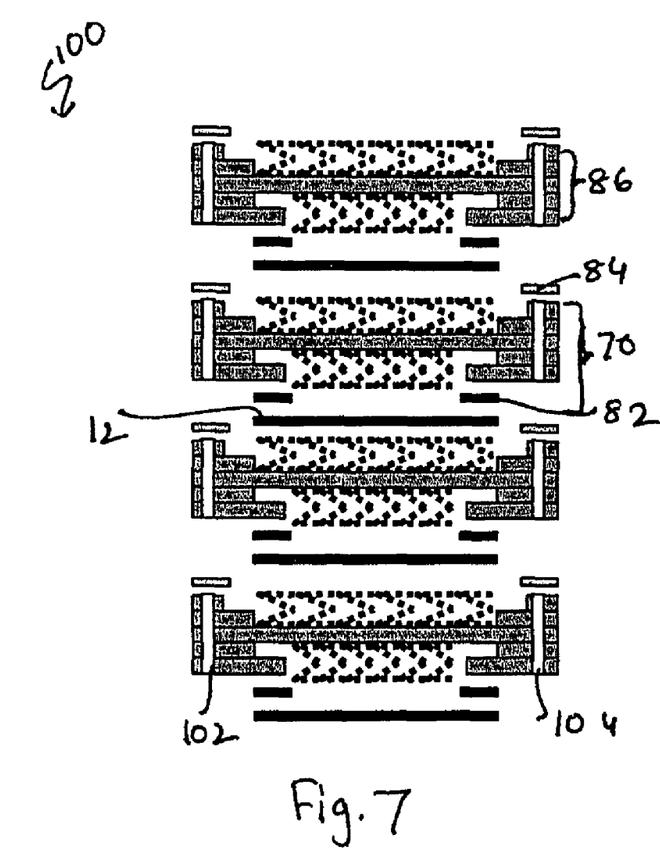
FIG. 7 illustrates a cross sectional view of an exemplary fuel cell stack.

FIG. 7 illustrates a cross-sectional view of an exemplary fuel cell stack 100 that comprises a plurality of repeat units 70. As described with respect to FIG. 5, each repeat unit 70 comprises a plurality of plates including a fuel box cover 72, a fuel passage plate 74, a bipolar plate 76, an oxidant passage plate 78, an oxidant box cover 80 and a fuel cell 12 sealed to the oxidant box cover 80 using a seal 82. A compressive gasket 84 as discussed in earlier sections is used to join one repeat unit to the adjacent repeat unit in the fuel cell stack 100. The stack 100 further comprises an inlet passage 102 for fuel introduction and an exit passage 104 for fuel exit.

Figure 8:
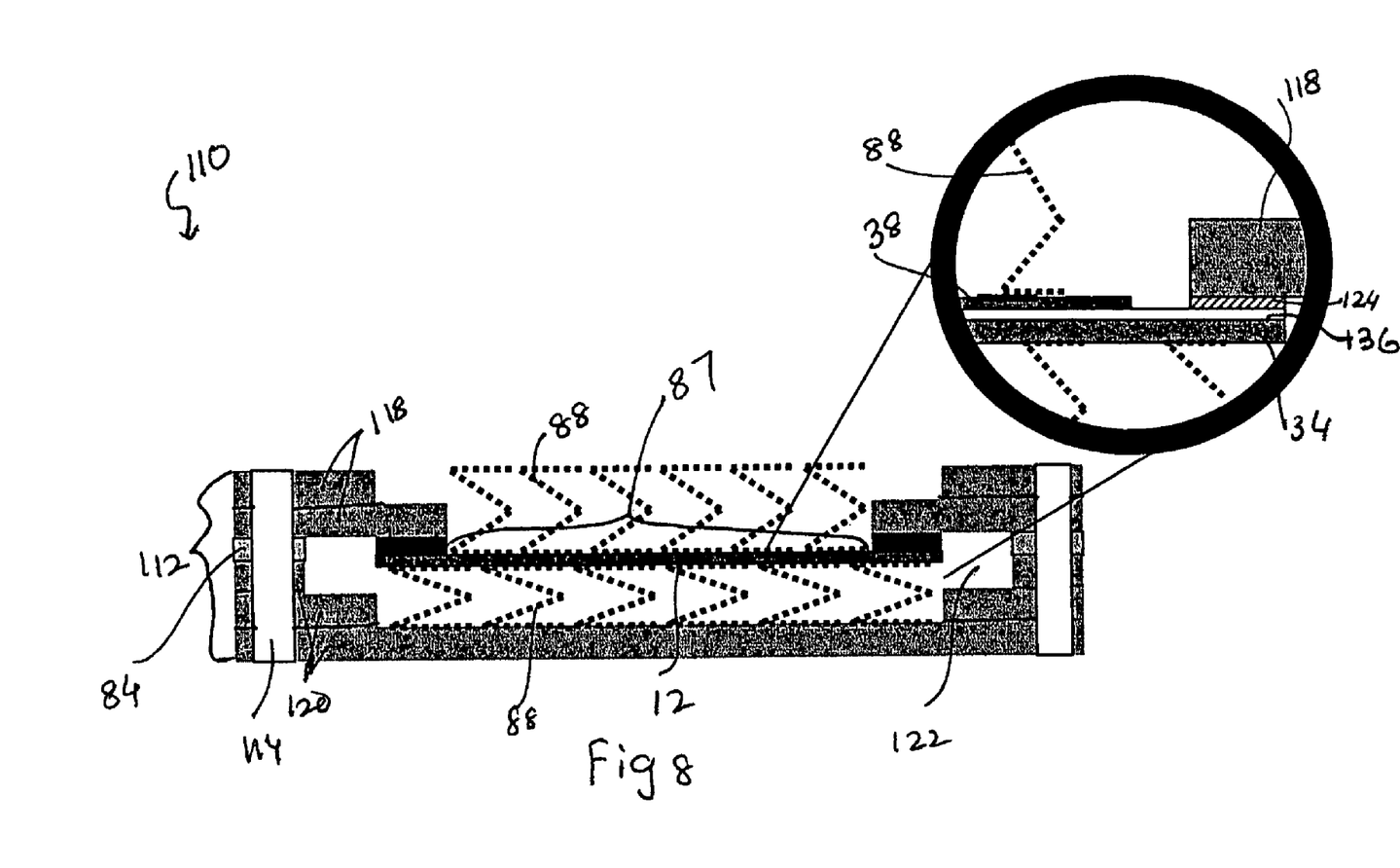
FIG. 8 illustrates a cross sectional view of an exemplary fuel cell assembly with exploded view of the sealing arrangement.

FIG. 8 illustrates yet another exemplary fuel cell assembly 110 comprising a separating structure 112 configured for separating a first reactant and a second reactant. The separating structure 112 comprises a top lid 118 (which is the oxidant passage lid 73 of one repeat unit as shown in FIG. 7) and a bottom lid (which is the fuel passage lid 71 of the next repeat unit as shown in FIG. 7). The separating structure 112 is configured to have an opening 87 therein. As illustrated in FIG. 8, the fuel cell assembly 110 further comprises a fuel cell 12 comprising a first electrode 38, a second electrode 34, and an electrolyte 36 interposed between said first and second electrodes and a passage 122 configured to introduce the second reactant to the second electrode 34. The opening 87 is situated within the top lid 118 and the bottom lid 120 faces the second electrode. In this exemplary embodiment, the first reactant is an oxidant and the second reactant is a fuel. Accordingly, the first electrode 38 is a cathode and the second electrode 34 is an anode. The electrolyte 36 is bonded to the separating structure 112 with the first electrode 38 being situated within the opening 87 of the separating structure 112, and the second electrode 34 is situated within the passage 122 configured to introduce the second reactant to the second electrode 34. The fuel cell assembly 110 further comprises a gasket 84 to seal the top lid 118 and the bottom lid 120. The fuel cell assembly 110 typically further comprises a set of compliant structures 88 on both sides of the fuel cell 12. The compliant structures 88 on the anode side are in contact with the anode 34 and the bottom lid 120. The compliant structures 88 are in contact with the cathode 38. These compliant structures 88 also create flow passages for the oxidant in the cathode side and the fuel in the anode side.

The gasket 84 electrically insulates the top lid 118 and the bottom lid 120 from one another. The force required to compress and seal the gaskets is delivered by an arrangement of bolts in tension. None of the force of the bolt load is carried by the fuel cell 12. The only forces on the fuel cell 12 after assembly are due to the compression of the compliant structures 88.

In the exemplary fuel cell assemblies and stacks described herein, the fuel cells are sealed to metallic separating structures. Once the stack assembly is completed, reactant passages are defined by the compressive gasket seals. The use of the gaskets to seal the reactant passages may be performed at low temperatures. The fuel cell seal may be inspected and repaired before the final assembly of the stack in this process. The gaskets also provide electrical insulation between two adjacent repeat units. The material of construction of the gaskets is cheap and readily available. The fuel cell systems described herein also prevent re-oxidation of the reduced anode as the perimeter of the anode is situated within the fuel passage where inert or reducing gases are used throughout the operation of the fuel cell system.

The exemplary fuel cell assembly 110 may have an end plate (not shown) in contact with the top lid 118 to form a stack comprising only one fuel cell assembly. In another embodiment, the fuel cell assembly 110 as shown in FIG. 8 may form the bottom of a stack comprising a plurality of such fuel cell assemblies.

The fuel cell systems described herein also accommodate compliant structures 88. The compliant structures 88 as shown in FIGS. 5-8, have several functions such as, elastically deforming to accommodate axial motion in the stack, limiting the reaction forces on the cell, conducting electricity through the stack, distributing reactant flows, and supporting the cell against axial stack loads. Advantageously the interconnect structure 88 is compliant enough to avoid strains on the cell during assembly. The compliant structure 88 also limits the reaction forces in the cell due to stack mechanical loads. In operation, the compliant structure 88 provides good electrical conduction through the stack and continues to do so after long periods at high temperature in either a reducing (anode interconnect) or oxidizing (cathode interconnect) environment. The compliant structure 88 further provides the fuel cell 12 with sufficient support to resist mechanical loads including differential pressure between the two-reactant streams, thermal gradients, and imposed sealing loads.

Finally, in some embodiments, the compliant structure 88 is designed to exert and maintain a spring force to keep the proper alignment of the cell 12 in operation.

In one embodiment, the compliant structure 88 is constructed from folded sheets of porous metal, such as, expanded mesh. Such a shape can be compressed in the stack axial direction without motion in the lateral direction. Other useful mesh shapes for construction of the compliant structure 88 include cylinders, spirals, diamond shape, rotated "V" shape, and a shape approximating the Greek capital letter sigma ($\Sigma$). In addition to expanded mesh, woven mesh, perforated sheet, woven wires, felt or any other sufficiently ductile porous metal sheet may be used. Expanded mesh is readily available and can be advantageously formed into the compliant structures 88 in an industrial process in a cost effective design.

The fuel cells disclosed herein may be selected from any type of fuel cell including, but not limited to, solid oxide fuel cells, proton exchange membrane fuel cells, molten carbonate fuel cells, phosphoric acid fuel cells, alkaline fuel cells, direct methanol fuel cells, regenerative fuel cells, zinc air fuel cells, and protonic ceramic fuel cells.

In all embodiments as described above, the exemplary fuel cell stacks comprise a bipolar structure. A bipolar structure is defined as a structure that is in contact with anode of one cell and cathode of the adjacent cell. In the exemplary fuel cell stack 40 as illustrated in FIG. 3, the bipolar structure is the separating structure 4 as it is in contact with anode 34 of one cell and cathode 38 of the adjacent cell through the flow channels 20 and 22 respectively. Flow channels 22 connect the separating structure 4 to the cathodes and flow channels 20 connect the separating structure 4 to anodes. In yet another embodiment, as shown in FIG. 5, the structure 86 is the bipolar structure that connects the anode of one cell to the cathode of the adjacent cell through the compliant structures 88.

In various embodiments discussed above, the number of individual cells in a stack or assembly determines the voltage of the fuel cell system, and ampere rating is determined, in large part, by the surface area of the electrodes.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:
1. A fuel cell assembly repeat unit comprising:
a separating structure configured to separate a first reactant and a second reactant, said separating structure having a first lid including an opening therethrough and a second lid bonded to the first lid;
a solid oxide fuel cell comprising a first electrode, a second electrode, and an electrolyte interposed between said first and second electrodes;
a passage defined by a space between said first lid and said second lid for introducing said second reactant to said second electrode;
a first compliant structure in contact with said first electrode of said solid oxide fuel cell; and
a second compliant structure in contact with said second electrode of said solid oxide fuel cell and said second lid, wherein said electrolyte is bonded to said separating structure with said first electrode situated within said opening of said separating structure and said second electrode situated within said passage, and wherein said first compliant structure and said second compliant structure serve a dual purpose of accommodating movement of said fuel cell assembly repeat unit and forming flow passages for said first reactant and said second reactant.

2. The fuel cell assembly according to claim 1, wherein said first electrode is an anode and said second electrode is a cathode.

3. The fuel cell assembly repeat unit according to claim 1, wherein said first electrode is a cathode and said second electrode is an anode.

4. The fuel cell assembly repeat unit according to claim 1, wherein said electrolyte is bonded to said separating structure by a glass seal.

5. The fuel cell assembly according to claim 1, wherein said first reactant is a fuel and said second reactant is an oxidant.

6. The fuel cell assembly repeat unit according to claim 1, wherein said first reactant is an oxidant and said second reactant is a fuel.

7. The fuel cell assembly according to claim 2, wherein said electrolyte is substantially impermeable to a gas and is configured to conduct oxygen ions between said cathode and said anode.

8. The fuel cell assembly repeat unit according to claim 1, wherein said separating structure comprises an electrically and ionically conductive material.

9. The fuel cell assembly repeat unit according to claim 1, wherein each compliant structure comprises an electrically conductive metal.

10. The fuel cell repeat unit according to claim 1, wherein the shape of each compliant structure is selected from the group consisting of a sigma shaped structure, a diamond shaped structure, and combinations thereof.

11. The fuel cell assembly repeat unit according to claim 1, wherein said fuel cell assembly repeat unit comprises one of a planar configuration and a tubular configuration.

12. A fuel cell assembly comprising:
a plurality of repeat units, at least some of the repeat units comprising
a separating structure configured to separate a first reactant and a second reactant, said separating structure having a first lid including an opening therethrough and a second lid bonded to the first lid;
a solid oxide fuel cell comprising a first electrode, a second electrode, and an electrolyte interposed between said first and second electrodes;
a passage defined by a space between said first lid and said second lid for introducing said second reactant to said second electrode;
a first compliant structure in contact with said first electrode; and
a second compliant structure in contact with said second electrode,
wherein said electrolyte is bonded to said separating structure with said first electrode situated within said opening, and said second electrode situated within said passage, and
wherein said first compliant structure and said second compliant structure serve a dual purpose of accommodating movement of said repeat unit and forming flow passages for said first reactant and said second reactant.

13. The fuel cell assembly according to claim 12, wherein said first electrode is a cathode and said second electrode is an anode.

14. The fuel cell assembly according to claim 12, wherein said first reactant is an oxidant and said second reactant is a fuel.

15. The fuel cell assembly according to claim 12, wherein said electrolyte is bonded to said separating structure by a glass seal.

16. A fuel cell stack comprising:
at least two fuel cell repeat units electrically coupled together such that at least one sealed passage extends between said at least two fuel cell repeat units, each of said at least two fuel cell repeat units comprising:
a solid oxide fuel cell comprising an anode and a cathode, and an electrolyte interposed between said anode and cathode;
an oxidant passage lid defining an oxidant passage configured to deliver an oxidant to said cathode, said oxidant passage having an opening therethrough;
a fuel passage lid bonded to the oxidant passage lid and defining a fuel passage to deliver a fuel to said anode;
a first compliant structure in contact with said cathode; and
a second compliant structure in contact with said anode,
wherein said electrolyte is bonded to said oxidant passage lid, with said cathode situated within said opening of said oxidant passage and said anode situated within said fuel passage, and
wherein said electrolyte is situated within a region bounded by said oxidant passage lid and said fuel passage lid, and
wherein said first compliant structure and said second compliant structure serve a dual purpose of accommodating movement of said at least two fuel cell repeat units and forming flow passages for said oxidant and said fuel.

17. The fuel cell stack according to claim 16, wherein said repeat unit comprises a gasket to join said at least two repeat units.

* * * * *

UNITED STATES PATENT AND TRADEMARK OFFICE
CERTIFICATE OF CORRECTION

PATENT NO. : 7,803,493 B2  
APPLICATION NO. : 10/953756  
DATED : September 28, 2010  
INVENTOR(S) : Bourgeois et al.

Page 1 of 1

It is certified that error appears in the above-identified patent and that said Letters Patent is hereby corrected as shown below:

In Column 2, Line 60, delete "wherein;" and insert -- wherein: --, therefor.

In Column 4, Line 27, delete "($O_2^-$)" and insert -- ($O^{2-}$) --, therefor.

In Column 9, Line 10, in Claim 2, delete "assembly" and insert -- assembly repeat unit --, therefor.

In Column 9, Line 19, in Claim 5, delete "assembly" and insert -- assembly repeat unit --, therefor.

In Column 9, Line 25, in Claim 7, delete "assembly" and insert -- assembly repeat unit --, therefor.

In Column 9, Line 35, in Claim 10, delete "cell" and insert -- cell assembly --, therefor.

Signed and Sealed this  
Twenty-eighth Day of June, 2011

David J. Kappos  
*Director of the United States Patent and Trademark Office*